United States Patent
Rihn (10) Patent No.: US 10,401,962 B2
(45) Date of Patent: Sep. 3, 2019

(54) HAPTICALLY ENABLED OVERLAY FOR A PRESSURE SENSITIVE SURFACE

(71) Applicant: Immersion Corporation, San Jose, CA (US)

(72) Inventor: William S. Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/188,344

(22) Filed: Jun. 21, 2016

(65) Prior Publication Data

US 2017/0364190 A1    Dec. 21, 2017

(51) Int. Cl.
*G06F 3/01* (2006.01)
*G06F 3/0488* (2013.01)

(52) U.S. Cl.
CPC .......... *G06F 3/016* (2013.01); *G06F 3/04886* (2013.01)

(58) Field of Classification Search
CPC .............................. G06F 3/016; G06F 3/0414
See application file for complete search history.

(56) References Cited

U.S. PATENT DOCUMENTS

| | | |
|---|---|---|
| 5,222,895 A | 6/1993 | Fricke |
| 5,717,423 A | 2/1998 | Parker |
| 6,303,008 B1 | 10/2001 | Pichulo et al. |
| 6,337,678 B1 | 1/2002 | Fish |
| 6,509,892 B1 | 1/2003 | Cooper et al. |
| 6,693,516 B1 | 2/2004 | Hayward |
| 6,819,312 B2 | 11/2004 | Fish |
| 6,940,485 B2 | 9/2005 | Noolandi |
| 7,113,177 B2 | 9/2006 | Franzen |
| 7,138,985 B2 | 11/2006 | Nakajima |
| 7,245,292 B1 | 7/2007 | Custy |
| 7,352,356 B2 | 4/2008 | Roberts et al. |
| 7,382,357 B2 | 6/2008 | Panotopoulos et al. |
| 8,004,501 B2 | 8/2011 | Harrison |
| 8,154,527 B2 | 4/2012 | Ciesla et al. |
| 8,179,375 B2 | 5/2012 | Ciesla et al. |

(Continued)

FOREIGN PATENT DOCUMENTS

| | | |
|---|---|---|
| CN | 102236463 A | 11/2011 |
| JP | 2000148393 A | 5/2000 |

(Continued)

OTHER PUBLICATIONS

Nathan Ingraham, "Tactus Technology unveils touchscreen prototype with appearing and disappearing keys (hands-on)", pp. 1-13, Jun. 5, 2012.

(Continued)

*Primary Examiner* — Sahlu Okebato
(74) *Attorney, Agent, or Firm* — Miles & Stockbridge P.C.

(57) ABSTRACT

Embodiments of the present invention are directed toward electronic devices configured to produce haptic effects, and to haptic enabled film overlays for pressure sensitive surfaces. The systems and methods for haptic enabled film overlays include a processor and a plurality of sensors, a pressure sensitive touch surface coupled to the plurality of sensors and configured to detect a user interaction, and an overlay including a tactile user interface and a plurality of haptic output devices, the overlay being configured to provide a haptic effect in response to the user interaction.

22 Claims, 8 Drawing Sheets

(56) References Cited

U.S. PATENT DOCUMENTS

| | | |
|---|---|---|
| 8,179,377 B2 | 5/2012 | Ciesla et al. |
| 8,199,124 B2 | 6/2012 | Ciesla et al. |
| 8,207,950 B2 | 6/2012 | Ciesla et al. |
| 8,243,038 B2 | 8/2012 | Ciesla et al. |
| 8,456,438 B2 | 6/2013 | Ciesla et al. |
| 8,547,339 B2 | 10/2013 | Ciesla |
| 8,553,005 B2 | 10/2013 | Ciesla et al. |
| 8,570,295 B2 | 10/2013 | Ciesla et al. |
| 8,587,541 B2 | 11/2013 | Ciesla et al. |
| 8,587,548 B2 | 11/2013 | Ciesla et al. |
| 8,619,035 B2 | 12/2013 | Ciesla et al. |
| 8,704,790 B2 | 4/2014 | Ciesla et al. |
| 8,717,326 B2 | 5/2014 | Ciesla |
| 8,723,832 B2 | 5/2014 | Ciesla et al. |
| 8,922,502 B2 | 12/2014 | Ciesla et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,947,383 B2 | 2/2015 | Ciesla et al. |
| 8,970,403 B2 | 3/2015 | Ciesla et al. |
| 9,013,417 B2 | 4/2015 | Ciesla et al. |
| 9,019,228 B2 | 4/2015 | Yairi et al. |
| 9,035,898 B2 | 5/2015 | Ciesla |
| 9,052,790 B2 | 6/2015 | Yairi et al. |
| 9,063,627 B2 | 6/2015 | Yairi et al. |
| 9,075,525 B2 | 7/2015 | Ciesla et al. |
| 9,098,141 B2 | 8/2015 | Ciesla et al. |
| 9,116,617 B2 | 8/2015 | Ciesla et al. |
| 9,128,525 B2 | 9/2015 | Yairi et al. |
| 9,207,795 B2 | 12/2015 | Ciesla et al. |
| 9,229,571 B2 | 1/2016 | Ciesla et al. |
| 9,239,623 B2 | 1/2016 | Yairi et al. |
| 9,274,612 B2 | 3/2016 | Ciesla et al. |
| 9,280,224 B2 | 3/2016 | Yairi et al. |
| 9,298,261 B2 | 3/2016 | Parthasarathy et al. |
| 9,298,262 B2 | 3/2016 | Yairi et al. |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,405,369 B2 | 8/2016 | Modarres et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 9,983,676 B2 | 5/2018 | Modarres et al. |
| 2002/0005864 A1 | 1/2002 | Temkin et al. |
| 2002/0054060 A1 | 5/2002 | Schena |
| 2003/0151597 A1 | 8/2003 | Roberts et al. |
| 2005/0030292 A1 | 2/2005 | Diederiks |
| 2005/0040962 A1 | 2/2005 | Funkhouser et al. |
| 2005/0057528 A1 | 3/2005 | Kleen |
| 2005/0285846 A1 | 12/2005 | Funaki |
| 2006/0115348 A1 | 6/2006 | Kramer |
| 2006/0143342 A1 | 6/2006 | Kim et al. |
| 2006/0197750 A1 | 9/2006 | Kerr et al. |
| 2006/0238510 A1 | 10/2006 | Panotopoulos et al. |
| 2006/0282170 A1 | 12/2006 | Hardwick et al. |
| 2007/0182718 A1 | 8/2007 | Schoener et al. |
| 2007/0236478 A1 | 10/2007 | Geaghan et al. |
| 2008/0147239 A1 | 6/2008 | Chiang et al. |
| 2008/0297475 A1 | 12/2008 | Woolf et al. |
| 2009/0002328 A1 | 1/2009 | Ullrich et al. |
| 2009/0115734 A1 | 5/2009 | Fredriksson et al. |
| 2009/0128503 A1 | 5/2009 | Grant et al. |
| 2009/0250267 A1 | 10/2009 | Heubel et al. |
| 2010/0013613 A1 | 1/2010 | Weston |
| 2010/0017759 A1 | 1/2010 | Birnbaum et al. |
| 2010/0156818 A1 | 6/2010 | Burrough et al. |
| 2010/0162109 A1 | 6/2010 | Chatterjee et al. |
| 2010/0177050 A1 | 7/2010 | Heubel et al. |
| 2010/0188327 A1 | 7/2010 | Frid et al. |
| 2010/0231367 A1 | 9/2010 | Cruz-Hernandez et al. |
| 2010/0231550 A1 | 9/2010 | Cruz-Hernandez et al. |
| 2010/0250071 A1 | 9/2010 | Pala et al. |
| 2010/0283731 A1 | 11/2010 | Grant et al. |
| 2010/0328053 A1 | 12/2010 | Yeh et al. |
| 2011/0018695 A1 | 1/2011 | Bells et al. |
| 2011/0163946 A1 | 7/2011 | Tartz et al. |
| 2011/0216013 A1 | 9/2011 | Siotis |
| 2011/0234502 A1 | 9/2011 | Yun et al. |
| 2011/0248916 A1 | 10/2011 | Griffin et al. |
| 2011/0260984 A1 | 10/2011 | Paleczny |
| 2011/0261021 A1 | 10/2011 | Modarres et al. |
| 2012/0133494 A1 | 5/2012 | Cruz-Hernandez et al. |
| 2012/0229402 A1 | 9/2012 | Grant et al. |
| 2012/0313857 A1 | 12/2012 | Senanayake et al. |
| 2013/0016042 A1 | 1/2013 | Makinen et al. |
| 2013/0079139 A1 | 3/2013 | Gray |
| 2014/0082489 A1 | 3/2014 | Park |
| 2014/0125471 A1 | 5/2014 | Organ et al. |
| 2014/0232679 A1 | 8/2014 | Whitman et al. |
| 2014/0247240 A1 | 9/2014 | Sinclair et al. |
| 2014/0281950 A1 | 9/2014 | White et al. |
| 2014/0320431 A1 | 10/2014 | Cruz-Hernandez et al. |
| 2014/0320436 A1 | 10/2014 | Modarres et al. |
| 2014/0354570 A1 | 12/2014 | Makinen et al. |
| 2014/0362014 A1 | 12/2014 | Ullrich et al. |
| 2015/0091414 A1* | 4/2015 | Lonnberg ............... G06F 3/016 310/330 |
| 2015/0145657 A1 | 5/2015 | Levesque et al. |
| 2015/0378492 A1* | 12/2015 | Rosenberg ............ G06F 3/0414 345/174 |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0306426 A1 | 10/2016 | Modarres et al. |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |
| 2018/0246574 A1 | 8/2018 | Modarres et al. |

FOREIGN PATENT DOCUMENTS

| | | |
|---|---|---|
| JP | 2002157087 A | 5/2002 |
| JP | 2003186622 A | 7/2003 |

(56) References Cited

FOREIGN PATENT DOCUMENTS

| JP | 200578644 A | 3/2005 |
|----|-------------|--------|
| JP | 2011242386 A | 12/2011 |
| WO | 2009045996 A2 | 4/2009 |

OTHER PUBLICATIONS

Trent Nouveau, "Mobile tactile tech gets physical", pp. 1-4, Jun. 5, 2012.
Larry Greenemeier, "Impermanent Press: New Deformable Surface to Give Smart Phone Touch Screens Raised Tactile Keyboards", Scientific American, pp. 1-3, Jun. 19, 2012.
Shaun K. Kane et al., "Touchplates: Low-Cost Tactile Overlays for Visually Impaired Touch Screen Users", pp. 1-8.
Yvonne Jansen et al., "MudPad: Tactile Feedback and Haptic Texture Overlay for Touch Surfaces", Its '10, Nov. 7-10, Saarbrucken, Germany. Copyright 2010. ACM 978-1-4503-0399-6/10/11, pp. 1-4.
D. Wang et al., "Haptic overlay device for flat panel touch displays",http://ieeexplore.ieee.org/xpl/login.jsp?tp=&arnumber=1287208&url=http%3A%2F%2Fieeexplore.ieee.org%2Fiel5%2F9046%2F28699%2F01287208.pdf%3Farnumber%3D1287208, last downloaded May 25, 2016.
Turo Keski-Jaskari et al., "Localized HD Haptics for Touch User Interfaces", AIA002WP(A2), http://files.iccmedia.com/pdf/aito140710.pdf, last downloaded May 25, 2016.
TactaPad: www.tactive.com, 6 pages.

* cited by examiner

Overlay 1

Actuator Locations

Actuator Locations with Input Zones

HAPTICALLY ENABLED OVERLAY FOR A PRESSURE SENSITIVE SURFACE

FIELD OF INVENTION

The embodiments of the present invention are generally directed to electronic devices, and more particularly, to electronic devices that produce haptic effects.

BACKGROUND

Electronic device manufacturers strive to produce a rich interface for users. Conventional devices use visual and auditory cues to provide feedback to a user. In some interface devices, kinesthetic feedback (e.g., active and resistive force feedback) and/or tactile feedback (e.g., vibration, texture, and heat) is also provided to the user, more generally known collectively as "haptic feedback" or "haptic effects." Haptic feedback can provide additional cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

An increasing number of devices, such as smartphones and tablets, include hardware, such as actuators, for generating haptic effects. Haptic effects, in particular, can enhance the viewing of audio and/or audio/video on these example devices, haptic effect accompaniment to an audio/video track can allow a viewer to "feel" an engine roaring in a car, explosions, collisions, and the shimmering feeling of sunlight. Other devices in which a user interacts with a user input element to cause an action also may benefit from haptic feedback or haptic effects. For example, such devices may include medical devices, automotive controls, remote controls, trackpads, and other similar devices.

SUMMARY OF THE INVENTION

Embodiments of the present invention are directed toward electronic devices configured to produce haptic effects, and to haptic enabled film overlays for pressure sensitive surfaces, that substantially improve upon the related art.

In one example, the systems and methods for haptic enabled film overlays include a processor and a plurality of sensors, a pressure sensitive touch surface coupled to the plurality of sensors and configured to detect a user interaction, and an overlay comprising a tactile user interface and a plurality of haptic output devices, the overlay being configured to provide a haptic effect in response to the user interaction, the haptic effect being spatially decoupled from the user interaction.

Additional features and advantages of the invention will be set forth in the description which follows, and in part will be apparent from the description, or may be learned by practice of the invention. The advantages of the embodiments of the present invention will be realized and attained by the structure particularly pointed out in the written description and claims hereof as well as the appended drawings. It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Touch enabled devices, such as pressure sensitive multi-touch input devices, have emerged as a popular interface. For example, large touchpad surfaces with advanced pressure sensitivity have been developed. Such pressure-sensitive multi-touch input devices can support the overlay of different "skins" or "overlays" that provide a contextual and static visual user interface on top of the pressure sensitive surface. For example, controls may look like piano keys, a traditional keyboard, or an artist's canvas with paint swatches, and the like. By applying haptic output devices to the relevant skins that can be overlaid onto the pressure sensitive surface, haptic effects may be extended to pressure sensitive devices and haptic effects may be achieved on either the whole surface or a defined area.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
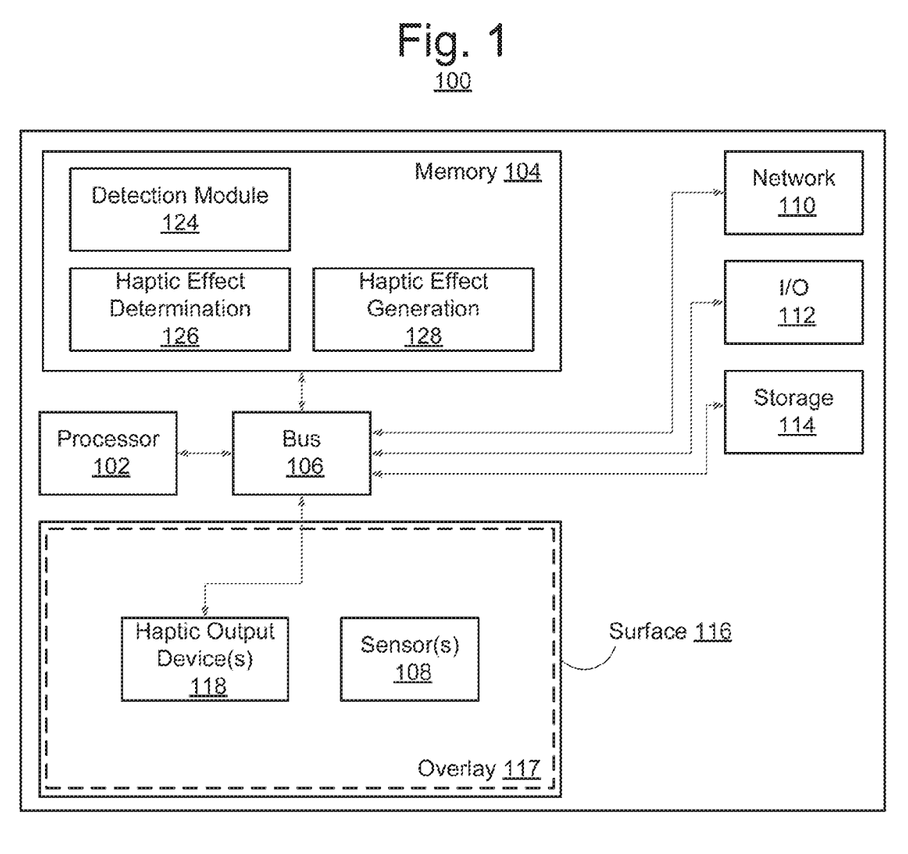
FIG. 1 illustrates a block diagram of a haptic enabled overlay for a pressure sensitive surface according to an example embodiment of the present invention.

FIG. 1 illustrates a block diagram of system 100 for a haptic enabled overlay for a pressure sensitive surface according to an example embodiment of the present invention. As shown in FIG. 1, system 100 comprises computing device 101 having processor 102 interfaced with other hardware, such as memory 104, via bus 106. In this example configuration, computing device 101 further includes one or more network interface devices 110, input/output ("I/O") interface components 112, additional storage 114, pressure sensitive surface 116, and overlay 117.

Pressure sensitive surface 116 or base device (e.g., a tablet or trackpad) may be integrated with or coupled to computing device 101. Pressure sensitive surface 116 includes any surface (e.g., touchpad, touchscreen, etc.) that is configured to sense input of a user. One or more sensors 108 are configured to detect touch at the pressure sensitive areas when one or more objects (e.g., finger, hand, stylus, brush, etc.) contact pressure sensitive surface 116 and provide appropriate data for use by processor 102. Sensors 108 may be configured to sense either a single touch and/or multiple simultaneous touches on pressure sensitive surface 116.

Any suitable number, type, and/or arrangement of sensors 108 can be used. For example, resistive and/or capacitive sensors may be embedded in pressure sensitive surface 116 and used to determine the location of a touch and other information, such as pressure. In another example, sensors 108 may include optical sensors that are configured to determine the touch positions. In some embodiments, sensors 108 may be configured to detect multiple aspects of the user interaction. For example, sensors 108 may detect the speed and pressure of a user interaction.

Pressure sensitive surface 116 is configured to be coupled to haptically enabled overlay 117. In an alternative configuration, pressure sensitive surface 116 and haptically enabled overlay 117 may be integrated as a single unit. In addition to providing contextual and static visual user interfaces on top of pressure sensitive surface 116, overlay 117 enables the rendering of haptic effects in conjunction with such interfaces. The thin structure of overlay 117 generally does not interfere with or otherwise impair the functionality of pressure sensitive surface 116. Using overlay 117, the haptic effects may be rendered for either the entire surface or pre-determined portions of pressure sensitive surface 116, depending on the interface design. For example, the haptic effects may be rendered on one or more isolated regions of overlay 117. In other words, the rendering of the haptic effects may be localized or non-localized with respect to regions of overlay 117. In some instances, the rendering of the haptic effects may be decoupled from the user input. For example, the haptic effects may be rendered in response to one or more user inputs on interface components 112. In another example, the user input may be received in a first region of overlay 117, and the haptic effects may be rendered at a second region of overlay 117. In addition, overlay 117 including its haptic output devices may be powered through its coupling to pressure sensitive surface 116.

Overlay 117 can vary in thickness (e.g., 2 mm-12 mm), and sensors 108 may be sensitive enough to detect touch independent of the thickness of overlay 117. In some embodiments, overlay 117 may include one or more portions of varying thickness. In such configurations, the profile of overlay 117 may include data for sensors 108 to either enhance the detection of touch in certain areas (e.g., a thicker portion) or dampen the sensitivity in certain areas (e.g., a thinner portion). The profile of overlay 117 also may contain data on the overlay materials and/or algorithms to compensate for different sensations caused by different materials (e.g., haptic effects may be rendered stronger for thicker portions and/or weaker for thinner portions).

Haptic output devices 118, in communication with processor 102, are formed within overlay 117. Haptic output devices 118 may be arranged in either single or multi-actuator configurations. Additional haptic output devices 118 may be disposed at pressure sensitive surface 116 and/or other components of the computing device 101. In some embodiments, haptic output device 118 is configured to output a haptic effect simulating a texture on overlay 117. For example, a variety of surface textures may be simulated. In another example, regions of overlay 117 may be selectively deformed (e.g., to simulate scrollable lists or pages). In yet another example, the perceived coefficient of friction may be varied by vibrating overlay 117 at different frequencies. Additionally, or alternatively, haptic output device 118 may provide vibrotactile haptic effects, electrostatic friction haptic effects, spatialized effects, temperature variation, and/or deformation haptic effects along overlay 117. Some haptic effects may utilize an actuator coupled to the housing (not shown) of computing device 101, and some haptic effects may use multiple actuators in sequence or in concert.

Haptic output devices 118 may use electrostatic attraction, for example by use of an electrostatic surface actuator, to simulate a texture on the surface of overlay 117 or to vary the coefficient of friction the user feels when moving his or her finger across overlay 117. For example, haptic output devices 118 may comprise an electrovibrotactile device that applies voltages and currents instead of mechanical motion to generate a haptic effect. In such an embodiment, the electrostatic actuator may comprise a conducting layer and an insulating layer. In such an embodiment, the conducting layer may be any semiconductor or other conductive material, such as copper, aluminum, gold, or silver. The insulating layer may be glass, plastic, polymer, or any other insulating material. Furthermore, processor 102 may operate the electrostatic actuator by applying an electrical signal to the conducting layer. The electric signal may be an AC signal that, in some embodiments, capacitively couples the conducting layer with an object near or touching overlay 117.

In some embodiments, the capacitive coupling may simulate a friction coefficient or texture on the surface of overlay 117. For example, the surface of overlay 117 may be smooth, but the capacitive coupling may produce an attractive force between an object near the surface of overlay 117. In some embodiments, varying the levels of attraction between the object and the conducting layer can vary the simulated texture on an object moving across the surface of overlay 117. Furthermore, in some embodiments, an electrostatic actuator may be used in conjunction with traditional actuators to vary the simulated texture on the surface of overlay 117 or output other effects. For example, the actuators may vibrate to simulate a change in the texture of the surface of overlay 117, while an electrostatic actuator may simulate a different texture on the surface of overlay 117.

In some embodiments, an electrostatic actuator may be used to generate a haptic effect by stimulating parts of the body or objects near or touching overlay 117. For example, in some embodiments, an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches overlay 117 and moves his or her finger along the surface, the user may sense a texture of prickliness, graininess, bumpiness, roughness, stickiness, or some other texture.

Various actuators may be used as haptic output devices 118, and other devices may be used. Haptic output devices 118 may be, for example, an electric motor, an electromagnetic actuator, a voice coil, a shape memory alloy, an electroactive polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some embodiments, deformation may be achieved using overlay 117. For example, overlay 117 may contain multiple layers (e.g., bottom layer may be thin plastic, top layer may be malleable fabric) wherein electromagnetic coils and/or air bladders and the like may be embedded within overlay 117. In any of these configurations, the haptic output device may include haptic output drive circuit. In addition, the haptic output device may be unidirectional or bidirectional.

Processor 102 may comprise one or more general or specific purpose processors to perform computation and control functions of system 100. Processor 102 may include a single integrated circuit, such as a micro-processing device, or may include multiple integrated circuit devices and/or circuit boards working in cooperation to accomplish the functions of processor 102. In addition, processor 102 may execute computer programs, such as an operating system applications stored within memory 104.

In some instances, processor 102 can determine which haptic effects are to be rendered and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations or other types of haptic effects on system 100.

Non-transitory memory 104 may include a variety of computer-readable media that may be accessed by processor 102. In the various embodiments, memory 102 may include volatile and nonvolatile medium, removable and non-removable medium. For example, memory 104 may include any combination of random access memory ("RAM"), dynamic RAM ("DRAM"), static RAM ("SRAM"), read only memory ("ROM"), flash memory, cache memory, and/or any other type of non-transitory computer-readable medium.

Network device 110 is configured to transmit and/or receive data with remote sources. Network device 110 may enable connectivity between a processor 102 and other devices by encoding data to be sent from processor 102 to another device over a network (not shown) and decoding data received from another system over the network for processor 102. For example, network device 110 may include a network interface card that is configured to provide wireless network communications. A variety of wireless communication techniques may be used including infrared, radio, Bluetooth, Wi-Fi, and/or cellular communications. Alternatively, network device 110 may be configured to provide wired network connection(s), such as an Ethernet/Internet connection. In some instances, network device 110 may be configured to exchange data with remote haptic devices and/or an Internet of Things ("IoT") network.

I/O components 112 may be used to facilitate connection to peripheral devices such as one or more displays, keyboards, mice, speakers, microphones, and/or other hardware used to input data or output data. Storage 114 represents nonvolatile storage such as magnetic, optical, or other storage media included in computing device 101.

Returning to memory 104, illustrative program components 124, 126, and 128 are depicted to illustrate how a device can be configured in some embodiments to provide haptic effects using an overlay input. In this example, a detection module 124 configures processor 102 to monitor pressure sensitive surface 116 and overlay 117 via sensors 108 to determine the position of one or more touches. For example, module 124 may sample sensors 108 in order to track the presence or absence of touches. If touches are present, sensors 108 may track one or more of the location, path, velocity, acceleration, pressure and/or other characteristics of the touches.

Haptic effect determination module 126 analyzes data regarding touch characteristics to select haptic effects for rendering. For example, haptic effects may be determined by characteristics of overlay 117. Alternatively, or additionally, this determination may be made based on characteristics of the touches, such as the location of contact, number of contacts, time of contact, pressure of contact, activity of contact, or features associated with haptic effects. Different haptic effects may be selected based on the location of each touch in order to simulate the presence of a feature by simulating a texture on a surface of overlay 117 or generally another type of haptic effect.

Haptic effect generation module 128 is configured to cause processor 102 to generate and transmit haptic signals to haptic output devices 118. For example, generation module 128 may access stored waveforms or commands to send to haptic output devices 118. As another example, haptic effect generation module 128 may receive a desired type of texture and utilize signal processing algorithms to generate an appropriate signal to send to haptic output devices 118. As yet another example, a desired texture may be indicated along with target coordinates for the texture and an appropriate waveform sent to one or more actuators to generate appropriate displacement of overlay 117 (and/or other device components).

Although shown as a single system, the functionality of system 100 may be implemented as a distributed system. For example, pressure sensitive surface 116 and overlay 117 may be detachable such that multiple overlays 117 may be coupled to pressure sensitive surface 116. In another example, system 100 may be part of a device (e.g., personal computer, console, video game console, etc.), and system 100 provides haptic effect functionality for the device. In another embodiment, system 100 may be separate from the device, and may remotely provide the aforementioned functionality for the device.

Figure 2:
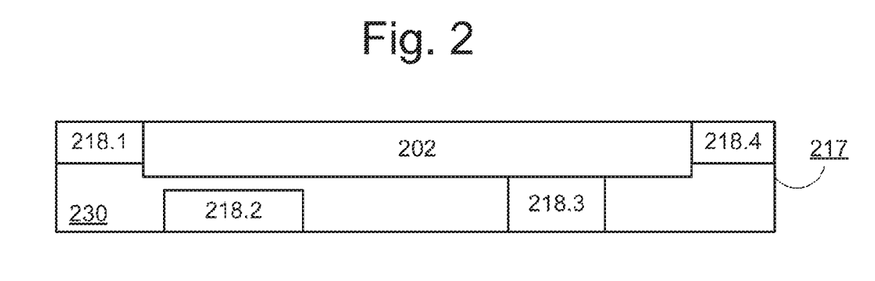
FIG. 2 illustrates a cross-sectional view of an overlay according to an example embodiment of the present invention.

FIG. 2 illustrates a cross-sectional view 200 of an overlay 217 according to an example embodiment of the present invention. As shown in FIG. 2, overlay 217 includes interface components 202, a plurality of haptic output devices 218.1-218.4, and substrate 230. Haptic output devices 218.1-218.4 may be integrally formed as part of substrate 230 of overlay 217. As discussed above, a variety of materials may be used within overlay 217. In some instances, the material may be associated with input and haptic profiles to optimize material/actuator combinations. In addition, haptic output devices of the corresponding host device may be used. For example, overlay 217 may be coupled to a pressure sensitive surface (e.g., element 116 of FIG. 1) of the computing device (e.g., element 101 of FIG. 1). It should be understood that numerous configurations of interface components 202 and haptic output devices 218.1-218.4 are feasible. Furthermore, it should be understood that each of the haptic output devices may comprise an actuator or any of the other haptic output devices described above.

Figure 3:
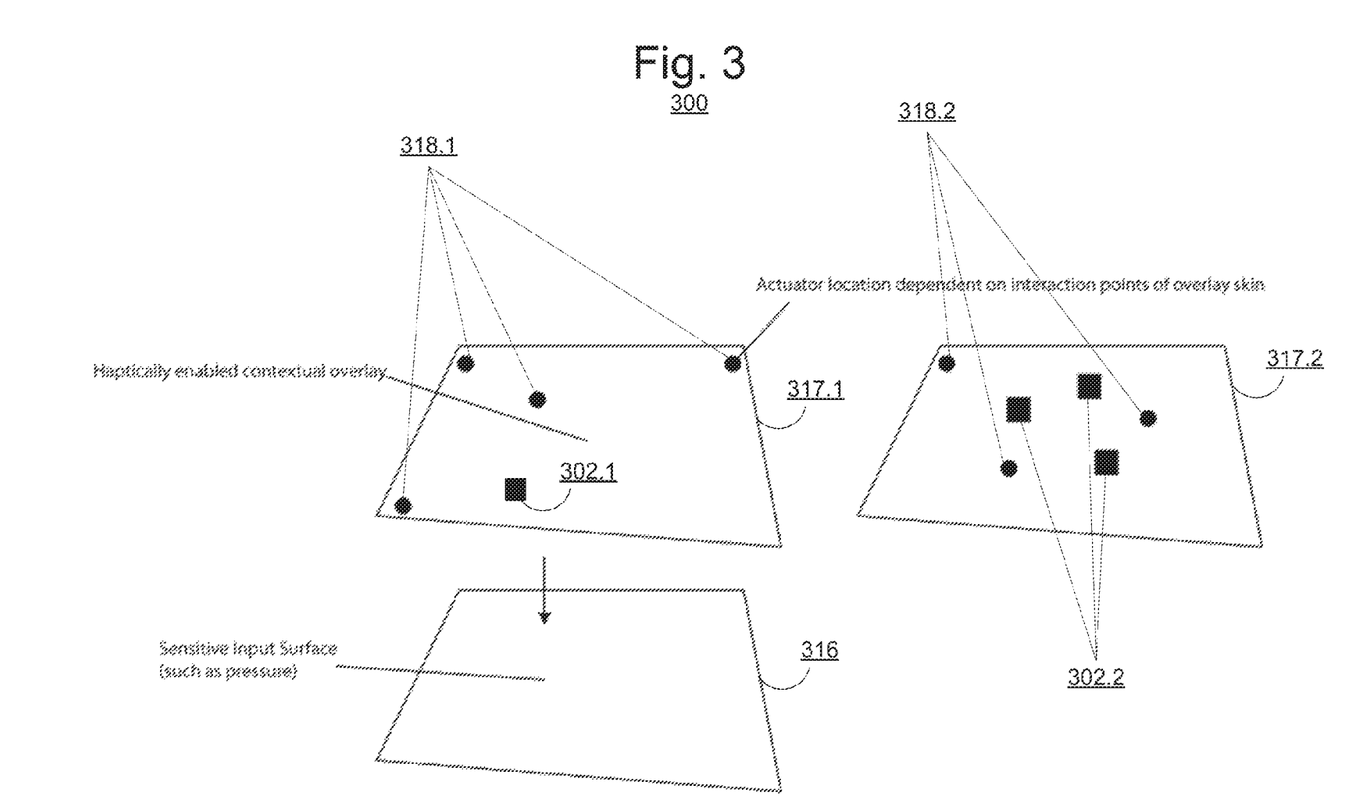
FIG. 3 illustrates a planar view of an overlay according to an example embodiment of the present invention.

FIG. 3 illustrates a planar view 300 of an overlay according to an example embodiment of the present invention. As shown in FIG. 3, each of overlays 317.1-317.2 is configured to be coupled to pressure sensitive surface 316. In addition, each of overlays 317.1-317.2 includes interface components 302.1-302.2 and a plurality of haptic output devices 318.1-318.2. Haptic output devices 318 may be integrally formed as part of overlay 317. It should be understood that numerous configurations of interface 302 and haptic output devices 318 are feasible, as shown by a comparison of overlays 317.1 and 317.2.

Figure 4:
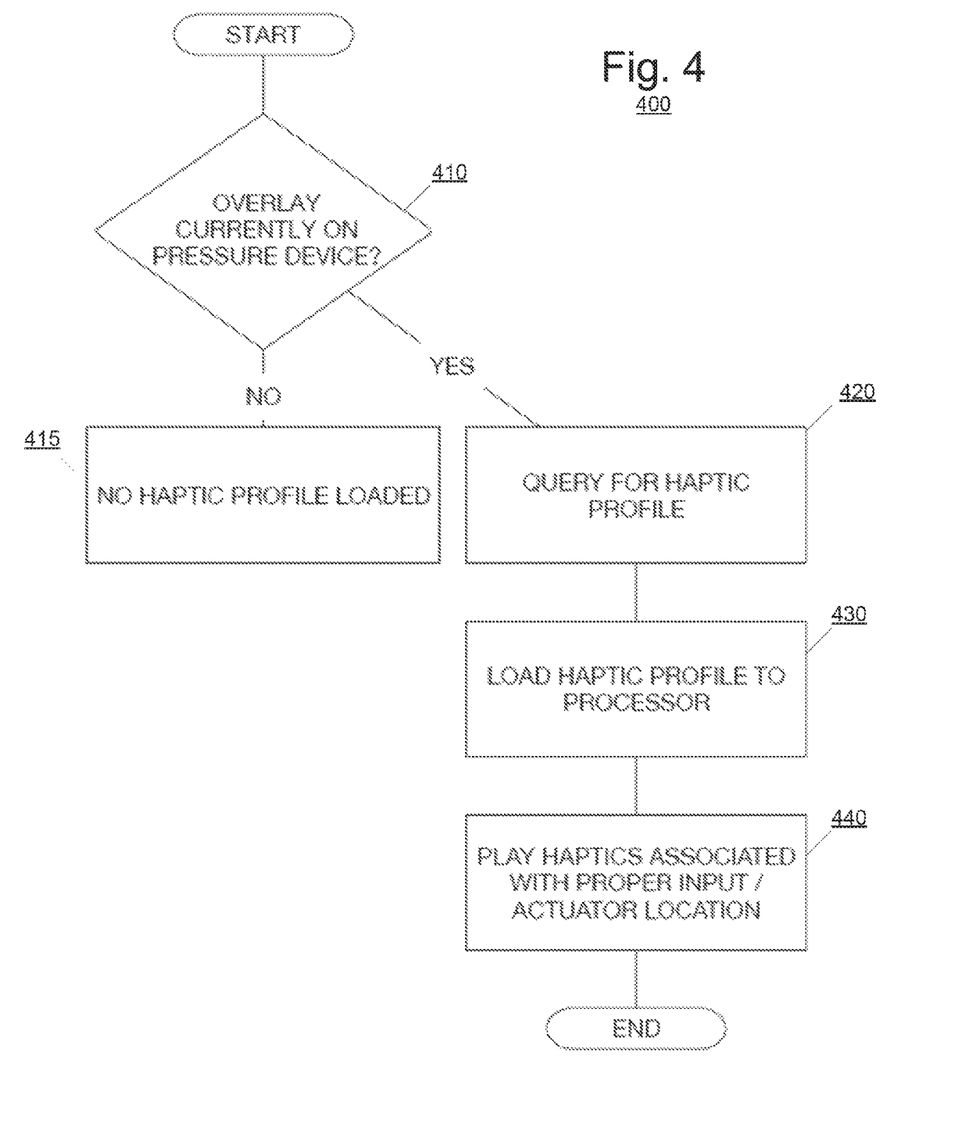
FIG. 4 illustrates a flow diagram of functionality for retrieving a haptic profile for an overlay according to an example embodiment of the present invention.

FIG. 4 illustrates a flow diagram of functionality 400 for retrieving a haptic profile for an overlay according to an example embodiment of the present invention. In some instances, the functionality of the flow diagram of FIG. 4 (and FIG. 5 below) is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 400 determines whether the overlay is coupled to the pressure sensitive surface, at 410. If no overlay is detected, then a corresponding haptic profile is not retrieved. Accordingly, no haptic profile is loaded, at 415.

Alternatively, if an overlay is detected at 410, then functionality 400 proceeds to 420. At 420, functionality 400 searches for and retrieves the haptic profile for the detected overlay. The haptic profile may be stored within the memory of the host device. Alternatively, the haptic profile may be stored within a local memory of the overlay itself. In ether configuration, the haptic profile is retrieved by the host device, at 430. Lastly, haptic effects may be rendered at the overlay based on upon the retrieved haptic profile, at 440. In some implementations, the haptic profile may identify the locations of the overlay's haptic output devices, types of haptic output devices, and/or their respective characteristics.

Figure 5:
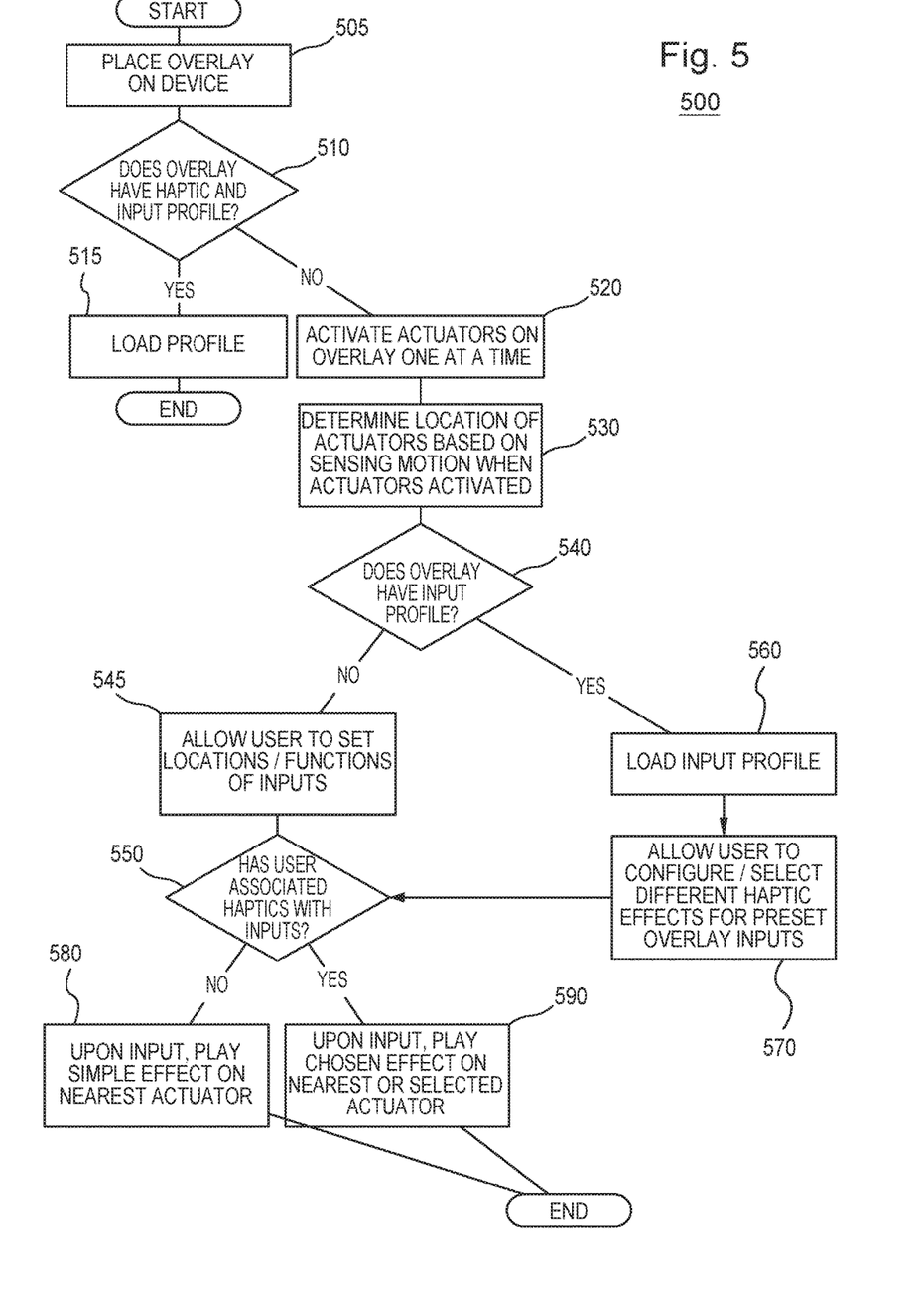
FIG. 5 illustrates a flow diagram of functionality for retrieving haptic and input profiles for an overlay according to another example embodiment of the present invention.

FIG. 5 illustrates a flow diagram of functionality 500 for retrieving haptic and input profiles for an overlay according to another example embodiment of the present invention.

At the outset, an overlay is coupled to the pressure sensitive device, at 505. Next, at 510, functionality 500 determines whether the overlay is associated with haptic and input profiles. If the overlay is associated with haptic and input profiles, functionality 500 retrieves the haptic and input profiles for the detected overlay. The haptic and input profiles may be stored within the memory of the host device. Alternatively, the haptic and input profiles may be stored within a local memory of the overlay itself. In ether configuration, the haptic and input profiles are retrieved by the host device, at 515. The input profile identifies the zones on the overlay where the user may be expected to interact (e.g., locations where there is an affordance or signage visual/tactilely). In addition, the input profile also may include information as to the material(s) used in the overlay and how a baseline point of pressure (e.g., X Newtons without overlay) might compare with the overlay at respective material points (e.g., pressure of X Newtons without overlay may be read as X' Newtons due to the properties of the material). The haptic profile may include information about the actuators included in the overlay and their properties. In addition, the haptic profile may include instructions for the actuators that depend on the overlay materials that may be specified in the input profile.

If the overlay is not associated with haptic and input profiles, functionality 500 individually or sequentially activates the haptic output devices of the overlay, at 520. Next, at 530, the host device determines the location of the haptic output devices. The respective locations of the haptic output devices may be determined by sensing motion when haptic output devices are activated.

At 540, functionality 500 determines whether the overlay has an input profile. If the overlay is not associated with an input profile, functionality 500 enables the user to set locations and functions of user-input elements of the overlay, at 545. For example, a user interface for generating the input profile may include the detection of actuator positions and the ability for the user to specify points of interaction. Once points of interaction are specified, the user may further identify actuators that should activate for each point. The user interface may prompt the user to draw shapes on a visual representation of the pressure pad (sans overlay), or prompt the user to tract the overlay portions with their fingers while the application records the shape. Here, functionality 550 further determines whether the user has associated haptic effects with user-input elements, at 550. If the user has not associated haptic effects with user-input elements, then functionality 550 selects a haptic effect to be rendered at the haptic output device nearest to the user input element, at 580. If the user has associated haptic effects with user-input elements, then functionality 550 renders the user selected haptic effects at the selected or nearest haptic output devices, at 590. In either configuration, the haptic effects may be authored by a user or selected from a haptic library.

Returning to 540, functionality 500 retrieves an input profile, at 560, if the overlay is associated with an input profile. Next, at 570, functionality 500 enables the user to configure and select different haptic effects. Functionality 500 then proceeds to 550, as discussed above.

In some embodiments, the overlay may include identifying tags (instead of profiles) that identify a context of the overlay (e.g., music, art, video game, etc.) such that haptic effects may be selected in accordance with the overlay's identifying tags. Such identifying tags may be exchanged with a host device via radio frequency identification ("RFID"), common contact point, or other communications technology.

Figure 6A:
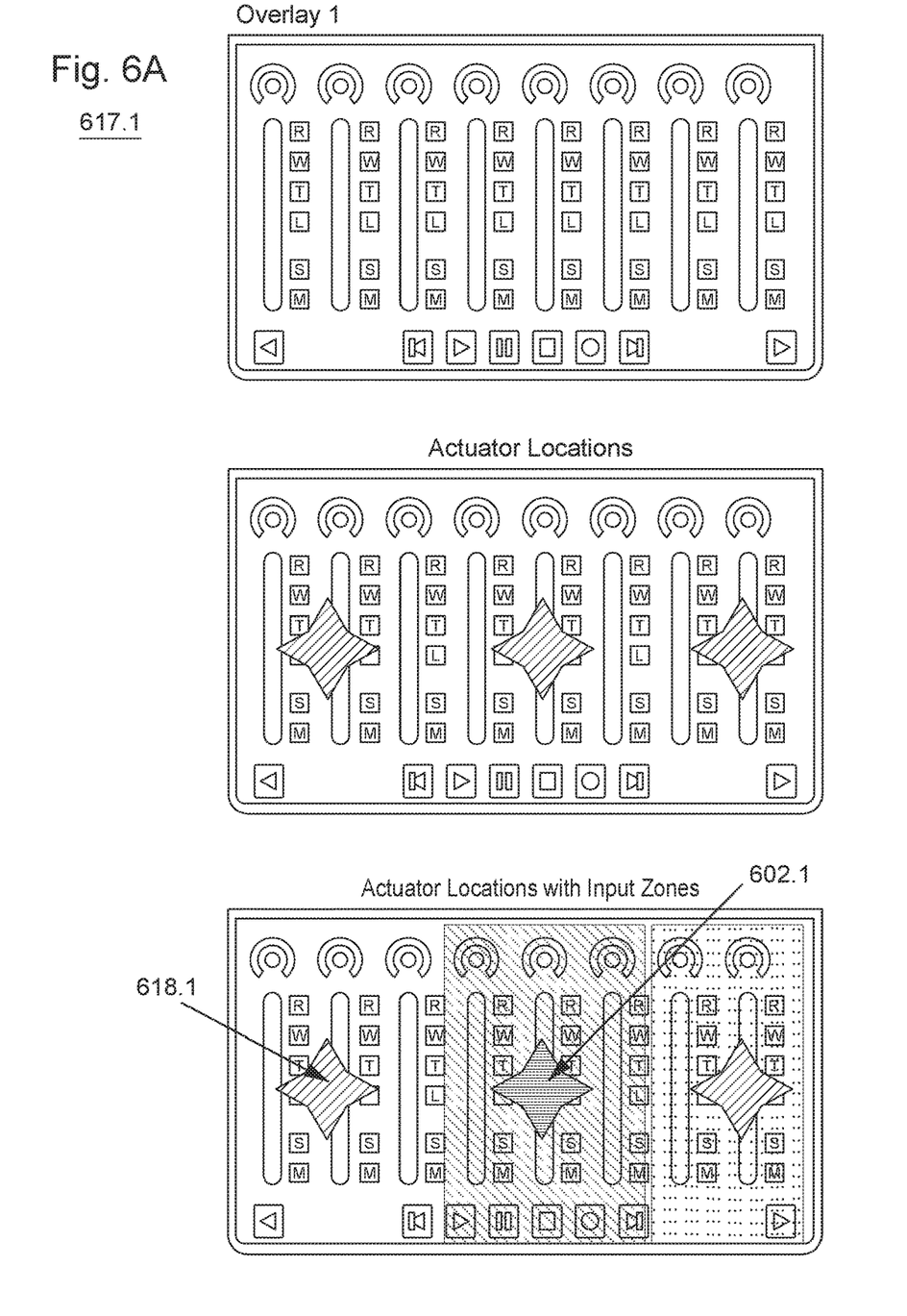
FIGS. 6A-6C illustrate user interfaces of an overlay according example embodiments of the present invention.
Figure 6B:
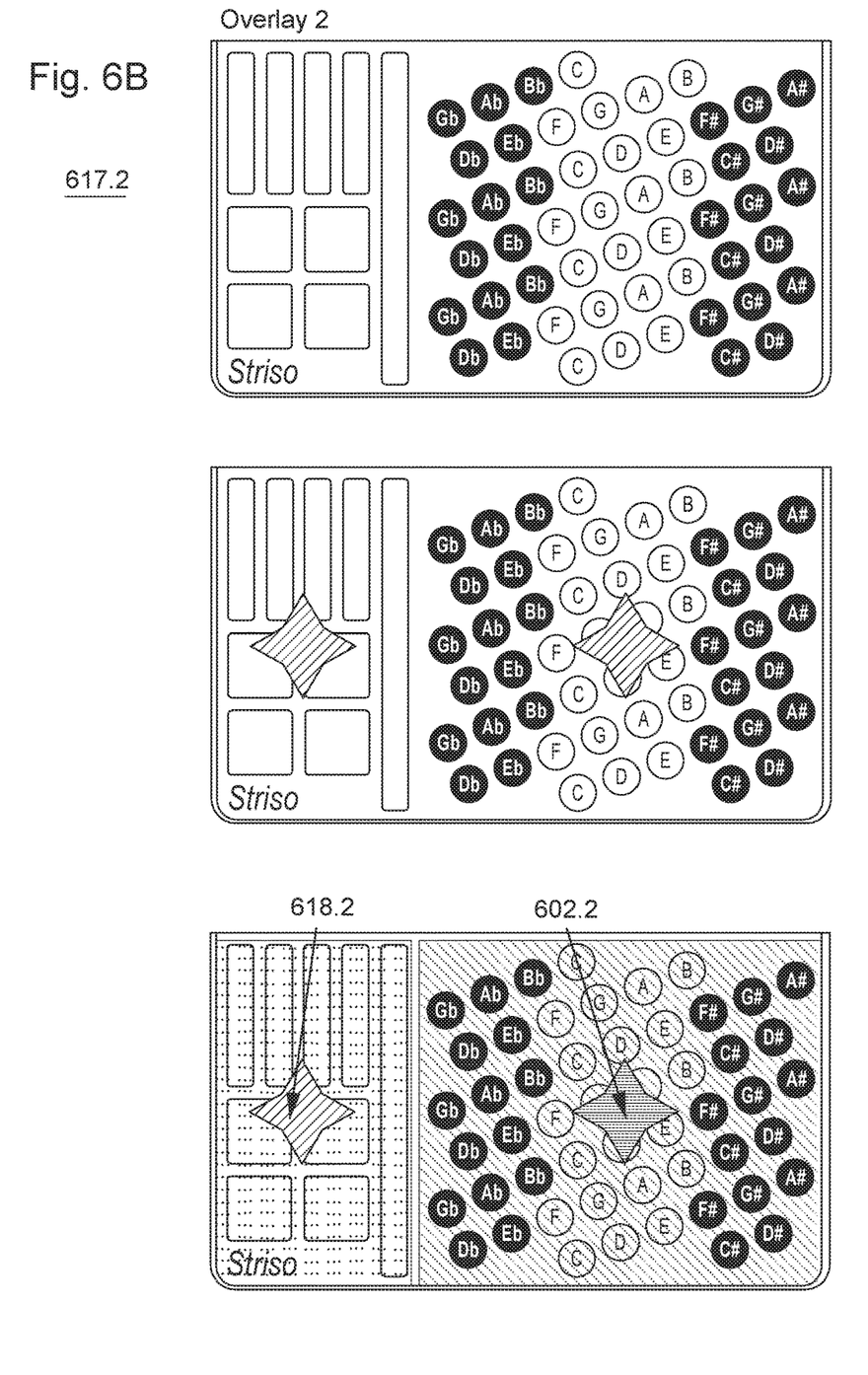
Figure 6C:
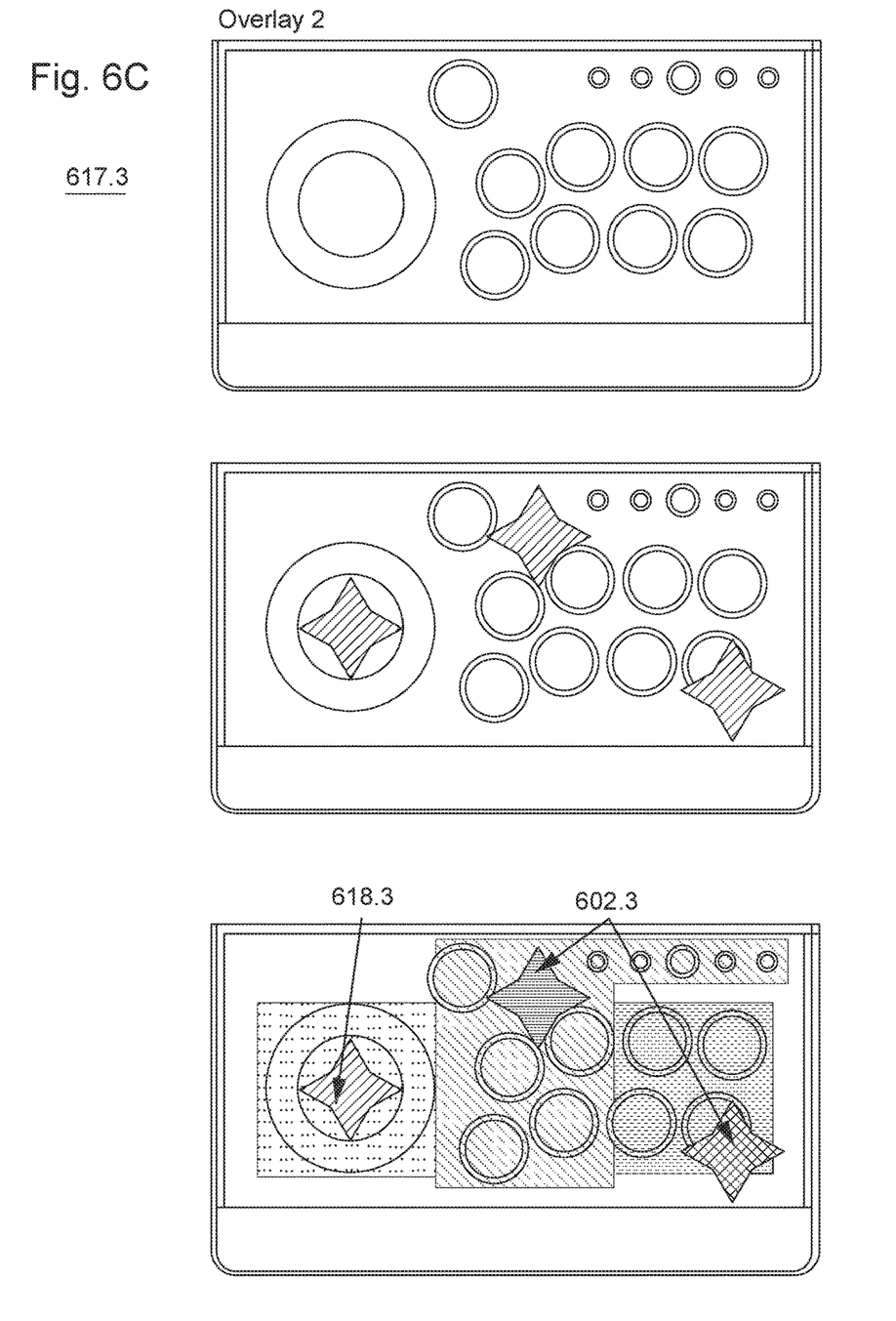

FIGS. 6A-6C illustrate user interfaces of overlay 617.1-617.3 according example embodiments of the present invention. As shown in FIG. 6, each of overlays 617.1-617.3 includes interface components 602.1-602.3 (e.g., buttons, knobs, sliders, etc.) and haptic output devices 618.1-618.3. Haptic output devices 618 may be integrally formed as part of overlay 617. It should be understood that numerous configurations of interface components 602 and haptic output devices 618 are feasible, as shown by overlays 617.1-617.3.

Accordingly, the embodiments described herein provide a haptic overlay for touch enabled devices, such as pressure sensitive input devices. Such pressure-sensitive input devices are configured to support a variety of customizable overlays that provide a contextual and static visual interface on top of the pressure sensitive surface. By applying haptic output devices to the overlays, haptic effects may be achieved on either the whole surface or a specific area of the pressure sensitive input devices. Moreover, the functionality of the pressure sensitive input devices is not impaired by the use of overlays.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A system comprising:
   a processor;
   a pressure sensitive touch surface comprising a sensor configured to detect a user touch; and
   an overlay comprising a tactile user interface and a haptic output device, the overlay being configured to provide a haptic effect in response to the user touch, the haptic effect being spatially decoupled from the user touch such that the user touch is received in a first region of the overlay and the haptic effect is rendered at a second region of the overlay.

2. The system of claim 1, wherein the overlay is detachably coupled to the pressure sensitive touch surface.

3. The system of claim 1, wherein a plurality of haptic output devices are integrally formed within the overlay.

4. The system of claim 1, wherein the haptic effect is rendered in conjunction with a haptic output device of a host device.

5. The system of claim 1, wherein the overlay stores haptic and input profiles.

6. The system of claim 1, wherein the overlay stores a haptic profile.

7. A method for rendering a haptic effect that is based on a user touch, the method comprising:
   detecting the user touch on a pressure sensitive touch surface having a sensor; and
   providing the haptic effect in response to the user touch on an overlay comprising a tactile user interface and a haptic output device, the haptic effect being spatially decoupled from the user touch such that the user touch is received in a first region of the overlay and the haptic effect is rendered at a second region of the overlay.

8. The method of claim 7, wherein the overlay is detachably coupled to the pressure sensitive touch surface.

9. The method of claim 7, wherein a plurality of haptic output devices are integrally formed within the overlay.

10. The method of claim 7, wherein the haptic effect is rendered in conjunction with a haptic output device of a host device.

11. The method of claim 7, wherein the overlay stores haptic and input profiles.

12. The method of claim 7, wherein the overlay stores a haptic profile.

13. A non-transitory computer readable storage medium storing one or more programs configured to be executed by a processor, the one or more programs comprising instructions for:
   detecting a user touch on a pressure sensitive touch surface having a sensor; and
   providing a haptic effect in response to the user touch on an overlay comprising a tactile user interface and a haptic output device, the haptic effect being spatially decoupled from the user touch such that the user touch is received in a first region of the overlay and the haptic effect is rendered at a second region of the overlay.

14. The non-transitory computer readable storage medium of claim 13, wherein the overlay is detachably coupled to the pressure sensitive touch surface.

15. The non-transitory computer readable storage medium of claim 13, wherein a plurality of haptic output devices are integrally formed within the overlay.

16. The non-transitory computer readable storage medium of claim 13, wherein the haptic effect is rendered in conjunction with a haptic output device of a host device.

17. The non-transitory computer readable storage medium of claim 13, wherein the overlay stores a haptic profile.

18. The non-transitory computer readable storage medium of claim 13, wherein the overlay stores an input profile.

19. The non-transitory computer readable storage medium of claim 13, wherein the overlay retrieves a haptic profile from a host device.

20. The non-transitory computer readable storage medium of claim 18, wherein the input profile includes a baseline point of pressure.

21. The system of claim 1, wherein the haptic effect is rendered according to a haptic profile of the overlay and a characteristic of the user touch.

22. The system of claim 21, wherein the characteristic of the user touch includes one of a number of contacts, a time of contact, or a pressure of contact.

* * * * *